United States Patent
Wan et al.

(10) Patent No.: US 10,944,929 B2
(45) Date of Patent: Mar. 9, 2021

(54) IMAGING APPARATUS AND IMAGING METHOD

(71) Applicant: Huawei Technologies Co., Ltd., Shenzhen (CN)

(72) Inventors: Wah Tung Jimmy Wan, Yokohama (JP); Jun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/328,183

(22) PCT Filed: Aug. 26, 2016

(86) PCT No.: PCT/CN2016/096962
§ 371 (c)(1),
(2) Date: Feb. 25, 2019

(87) PCT Pub. No.: WO2018/035859
PCT Pub. Date: Mar. 1, 2018

(65) Prior Publication Data
US 2019/0199952 A1 Jun. 27, 2019

(51) Int. Cl.
*H04N 5/369* (2011.01)
*H04N 5/359* (2011.01)
(Continued)

(52) U.S. Cl.
CPC .......... *H04N 5/36961* (2018.08); *G03B 7/093* (2013.01); *G03B 13/36* (2013.01);
(Continued)

(58) Field of Classification Search
CPC .......... H04N 5/36961; H04N 5/23212; H04N 5/243; H04N 5/3591; G03B 7/093; G03B 13/36
See application file for complete search history.

(56) References Cited

U.S. PATENT DOCUMENTS

2007/0116382 A1   5/2007   Gotanda
2014/0008514 A1   1/2014   Hamada
(Continued)

FOREIGN PATENT DOCUMENTS

CN   1971398 A    5/2007
CN   102890386 A  1/2013
(Continued)

*Primary Examiner* — Ahmed A Berhan
(74) *Attorney, Agent, or Firm* — Slater Matsil, LLP

(57) ABSTRACT

Image sensor having multiple pixels; a number of phase pixels which are included in the multiple pixels and which output a first signal indicating intensity of light; a first adjustment portion conducting gain adjustment on the number of phase pixels in reference to the first signal; an auto-focus portion adjusting a focal point of the image in reference to a second signal output from the number of phase pixels after the gain adjustment; a compensation portion generating and outputting a compensation signal indicating intensity of light received by the number of phase pixels in reference to signals output from the multiple pixels; a second adjustment portion determining exposure and gain for taking the image in reference to signals output from the multiple pixels and applying the exposure and the gain to the multiple pixels; and an image processing portion inputting both the compensation signal and signals and generating image data.

17 Claims, 7 Drawing Sheets

(51) Int. Cl.
  *G03B 7/093* (2006.01)
  *H04N 5/232* (2006.01)
  *H04N 5/243* (2006.01)
  *G03B 13/36* (2006.01)
  *H04N 9/04* (2006.01)

(52) U.S. Cl.
  CPC ......... *H04N 5/232* (2013.01); *H04N 5/23212* (2013.01); *H04N 5/243* (2013.01); *H04N 5/359* (2013.01); *H04N 5/3591* (2013.01); *H04N 5/3696* (2013.01); *H04N 9/045* (2013.01)

(56) References Cited

U.S. PATENT DOCUMENTS

| | | |
|---|---|---|
| 2015/0092098 A1 | 4/2015 | Konishi |
| 2015/0109522 A1 | 4/2015 | Kimura |
| 2015/0181108 A1 | 6/2015 | Endo |
| 2015/0256738 A1* | 9/2015 | Inoue ................ G02B 7/34 348/362 |
| 2015/0381869 A1 | 12/2015 | Mlinar |
| 2016/0014327 A1 | 1/2016 | Iwasaki |
| 2016/0021299 A1 | 1/2016 | Endo |
| 2016/0286108 A1* | 9/2016 | Fettig .................. H04N 5/2355 |

FOREIGN PATENT DOCUMENTS

| | | |
|---|---|---|
| CN | 104580921 A | 4/2015 |
| CN | 104603662 A | 5/2015 |
| CN | 104813212 A | 7/2015 |
| CN | 105008976 A | 10/2015 |
| CN | 105074528 A | 11/2015 |

* cited by examiner

: Left-Shielded Phase Pixel

: Right-Shielded Phase Pixel

IMAGING APPARATUS AND IMAGING METHOD

CROSS-REFERENCE TO RELATED APPLICATIONS

This application is a national stage of International Application No. PCT/CN2016/096962 filed on Aug. 26, 2016, which is hereby incorporated by reference in its entirety.

TECHNICAL FIELD

The present application relates to, for example, an imaging apparatus and an imaging method

BACKGROUND

In general, various devices, for example, cellular phones, smart phones, laptop computers, automobiles, medical devices and other devices come equipped with imaging apparatuses. Not only mobile devices, but also various apparatuses include imaging apparatuses, such as camera systems and/or digital cameras. For example, security systems and apparatuses, such as interphones include camera systems.

Many users easily take digital pictures or digital images, and an imaging apparatuses/method with improved quality is desired

SUMMARY

This summary shows the following aspects. However, it should be noted that this summery does not limit and/or restrict the scope of the invention and this application.

For example, in a first aspect, an imaging apparatus capturing an image may include: an image sensor having multiple pixels; a number of phase pixels which are included in the multiple pixels and which output a first signal indicating intensity of light; a first adjustment portion conducting gain adjustment on the number of phase pixels in reference to the first signal; an auto-focus portion adjusting a focal point of the image in reference to a second signal output from the number of phase pixels after the gain adjustment; a compensation portion generating and outputting a compensation signal indicating intensity of light received by the number of phase pixels in reference to signals output from the multiple pixels; a second adjustment portion determining exposure and gain for taking the image in reference to signals output from the multiple pixels and applying the exposure and the gain to the multiple pixels; and an image processing portion inputting both the compensation signal and signals output from the multiple pixels to which the exposure and the gain were applied, and generating image data. This aspect may avoid saturation when focusing and taking images.

The imaging apparatus of a second aspect according to the first aspect may further include multiple local pixels which are included in the multiple pixels and which are neighboring the multiple phase pixels, wherein the first adjustment portion conducts gain adjustment of the multiple local pixels. This aspect may avoid saturation when focusing and taking images.

In the imaging apparatus of a third aspect according to the first aspect, if the first adjustment portion detects saturation of a phase pixel included in the multiple phase pixels in reference to the first signal, the first adjustment portion may reduce the gain of the saturated phase pixel. This aspect may avoid saturation when focusing and taking images.

In the imaging apparatus of a fourth aspect according to the second aspect, if the first adjustment portion detects saturation of a phase pixel included in the multiple phase pixels in reference to the first signal, the first adjustment portion may reduce the gain of the saturated phase pixel and the gain of a local pixel included in the multiple local pixels and neighboring the saturated phase pixel. This aspect may avoid saturation when focusing and taking images.

In the imaging apparatus of fifth aspect according to the first aspect, the second adjustment portion may be operable in parallel with the auto-focus portion. The imaging apparatus of this aspect may conduct fast focusing and imaging operations.

In the imaging apparatus of sixth aspect according to the third aspect, the first adjustment portion may repeatedly reduce the gain of the saturated phase pixel until the saturation is resolved. This aspect may avoid saturation when focusing and taking images.

In the imaging apparatus of a seventh aspect according to the first aspect, the first adjustment portion may increase the gain of a phase pixel included in the multiple phase pixels if intensity of light received by the phase pixel is lower than a predetermined range in reference to the first signal. This aspect may compensate the brightness when focusing and taking images.

In the imaging apparatus of an eighth aspect according to the second aspect, the first adjustment portion may increase the gain of a local pixel included in the plurality of local pixels if intensity of light received by a phase pixel included in the multiple phase pixels and neighboring the local pixel is lower than a predetermined range in reference to the first signal. This aspect may compensate the brightness when focusing and taking images.

A mobile terminal of a ninth aspect may include the imaging apparatus according to the first aspect. This aspect may provide a mobile terminal with improved imaging quality.

In the imaging apparatus of a tenth aspect according to the first aspect, the first adjustment portion may conduct an exposure adjustment of the multiple phase pixels, and the second signal is generated after the exposure adjustment of the multiple phase pixels. This aspect may avoid saturation when focusing and taking images.

An imaging method of an eleventh aspect for taking an image may include: outputting a first signal indicating intensity of light received by multiple phase pixels, wherein the multiple phase pixels are included in multiple pixels; conducting gain adjustment on the multiple phase pixels by a first adjustment portion in reference to the first signal; adjusting a focal point of the image by an auto-focus portion in reference to a second signal output from the multiple phase pixels after the gain adjustment; generating and outputting, by a compensation portion, a compensation signal indicating intensity of light received by the multiple phase pixels in reference to signals output from the multiple pixels; by a second adjustment portion, determining exposure and gain for taking the image in reference to signals output from the multiple pixels and applying the exposure and the gain to the multiple pixels; and by an image processing portion, inputting both the compensation signal and signals output from the multiple pixels to which the exposure and the gain were applied and generating image data. This aspect may avoid saturation when focusing and taking images.

The imaging method of a twelfth aspect according to the eleventh aspect may further include: conducting, by the first adjustment portion, gain adjustment of multiple local pixels which are included in the multiple pixels and which are neighboring the multiple phase pixels. This aspect may avoid saturation when focusing and taking images.

The imaging method of a thirteenth aspect according to the eleventh aspect may further include: reducing, by the first adjustment portion, the gain of a phase pixel included in the multiple phase pixels if the first adjustment portion detects saturation of the phase pixel in reference to the first signal. This aspect may avoid saturation when focusing and taking images.

The imaging method of a fourteenth aspect according to the twelfth aspect may further include: reducing, by the first adjustment portion, the gain of a phase pixel included in the multiple phase pixels and the gain of a local pixel included in the multiple local pixels if the first adjustment portion detects saturation of the phase pixel in reference to the first signal. This aspect may avoid saturation when focusing and taking images.

In the imaging method of a fifteenth aspect according to the eleventh aspect, the second adjustment portion may be operable in parallel with the auto-focus portion. The imaging method of this aspect may improve operation time of focusing and imaging.

In the imaging method of a sixteenth aspect according to the thirteenth aspect, the first adjustment portion may repeatedly reduce the gain of the saturated phase pixel until the saturation is resolved. This aspect may avoid saturation when focusing and taking images.

The imaging method of a seventeenth aspect according to the eleventh aspect may further include: increasing, by the first adjustment portion, the gain of a phase pixel included in the multiple phase pixels if intensity of light received by the phase pixel is lower than a predetermined range in reference to the first signal. This aspect may compensate the brightness when focusing and taking images.

The imaging method of an eighteenth aspect according to the twelfth aspect may further include: increasing, by the first adjustment portion, the gain of a local pixel included in the multiple local pixels if intensity of light received by a phase pixel included in the multiple phase pixels and neighboring the local pixel is lower than a predetermined range in reference to the first signal. This aspect may compensate the brightness when focusing and taking images.

A mobile terminal of a nineteenth aspect may be configured to conduct operations of the imaging method according to the eleventh aspect. This aspect may provide a mobile terminal with improved imaging quality.

In the imaging method of twentieth aspect according to the eleventh aspect, the conducting gain adjustment on the multiple phase pixels may include conducting an exposure adjustment of the multiple phase pixels, and the second signal is generated after the exposure adjustment of the multiple phase pixels. This aspect may avoid saturation when focusing and taking images.

An imaging apparatus of a twenty-first aspect for capturing an image may include: an image sensing means including multiple pixels; multiple phase pixels which are included in the multiple pixels and which output a first signal indicating intensity of light; a first adjusting means conducting gain adjustment on the multiple phase pixels in reference to the first signal; an auto-focusing means adjusting a focal point of the image in reference to a second signal output from the multiple phase pixels after the gain adjustment; a compensation means generating and outputting a compensation signal indicating intensity of light received by the multiple phase pixels in reference to signals output from the multiple pixels; a second adjusting means determining exposure and gain for taking the image in reference to signals output from the multiple pixels and applying the exposure and the gain to the multiple pixels; and an image processing means inputting both the compensation signal and signals output from the multiple pixels to which the exposure and the gain were applied, and generating image data. This aspect may avoid saturation when focusing and taking images.

DETAILED DESCRIPTION OF ILLUSTRATIVE EMBODIMENTS

The example(s) and embodiment(s) of the present application are explained below.

1. Bayer Pixel Pattern

An imaging apparatus used for taking images may include an image sensor, for example, CCD (Charge-Coupled Device) and CMOS (Complementary MOS (Metal Oxide Semiconductor)) while using a Bayer pixel pattern.

Figure 1:
FIG. 1 is a diagram showing an example of phase pixels located on a Bayer format image sensor.
Figure 1:

FIG. 1 shows an example of a Bayer pixel pattern. In this Bayer pixel pattern, an image is expressed using pixels with three colors which are red (R), blue (B) and green (G).

The imaging apparatus used for taking images may include an auto-focusing function. The auto-focusing function detects and adjusts a focus on an image. The imaging apparatus may include pixels for detecting a focus of an image. In FIG. 1, a portion of pixels are pixels for detecting the focus, for example, a portion of pixels "G".

In general, amount of light depends on cases in which an image is taken or captured. For example, on a fine day, the amount of light may be large when taking an image in daytime under the sun. Compared to this, the amount of light may be small when taking an image at night with only light of the stars. Therefore, the imaging apparatus may have an exposure control function which adjusts the interval driving which the pixels are open to collect the light.

In addition, the imaging apparatus may have a gain control function which adjusts and/or amplifies signals indicating the amount of light.

These exposure control function and gain control function may be implemented in a global manner, that is, a single setting of gain/exposure is applied to all pixels in a whole frame which is an image taken or captured with the imaging apparatus. Therefore, this single setting affects how the pixels react to the light.

The imaging apparatus including an auto-focusing means can determine how much a sensed image deviates from a focal point by detecting the phase of pixels. The imaging apparatus, for example, divides the light incoming through a lens into a couple of beams, forms a couple of images and calculates the focal point based on the distance between the couple of images, and thus, the imaging apparatus can focus the image.

The imaging apparatus may have another means for auto-focusing that is by detecting the contrast. In this contrast-based solution, a lens is moved based on an image on the image sensor, and the apparatus focuses on the image by detecting a position which has a large difference between the brightness and darkness.

A phase detection is a different solution for auto-focusing from the contrast-based solution, and the phase detection uses phase pixels arranged on an image sensor in the same manner as RGB pixels. These phase pixels are right-shielded phase pixels and left-shielded phase pixels. In FIG. 1, G pixels include the right/left-shielded phase pixels. A couple of images described above are generated through the right-shielded phase pixels and left-shielded phase pixels.

The imaging apparatus may include PDAF (Phase Detection Auto-Focus) sensors for detection at phase pixels so as to conduct an accurate and fast auto-focusing operation. For the fast and accurate auto focus, PDAF sensors need to work in the proper illumination condition, and the very strong light or low light conditions will impact the performance of the phase detection. The exposure control and gain control optimized globally according to whole frame illumination condition may not be appropriate for PDAF sensor.

In the meantime, saturation and blooming are effects that are caused by excessive electrons collected in a pixel. Once a pixel reaches full well capacity (saturation), that pixel can start to affect neighboring pixels and possibly cause artefacts such as blooming. These effects can impact the performance and accuracy of phase detection. By implementing a system for separate exposure and gain control for phase pixels and neighboring pixels, negative impact on the performance of phase detection may be reduced.

If the exposure control and gain control are settled globally according to whole frame illumination condition, the exposure and gain may not be specifically optimized for auto focus purpose.

In general, the fast and accurate auto focusing function may be a preferable feature. PDAF sensors may need to work in the proper illumination condition, and as described above, very strong light or low light conditions will impact the performance of phase detection. If the exposure control and gain control are optimized globally according to whole frame illumination condition, PDAF sensors may not work well in very strong light and low light conditions.

On the other hand, saturation and blooming are problems caused by excessive electrons collected at the pixels. When one pixel is full of electrons (saturated), it may cause blooming, and the pixel may negatively influence neighboring pixels. By implementing a system or an apparatus for separate exposure and gain control for phase pixels and neighboring pixels, this negative impact on the performance of phase detection may be reduced.

2. Example of an Imaging Apparatus

Figure 2:
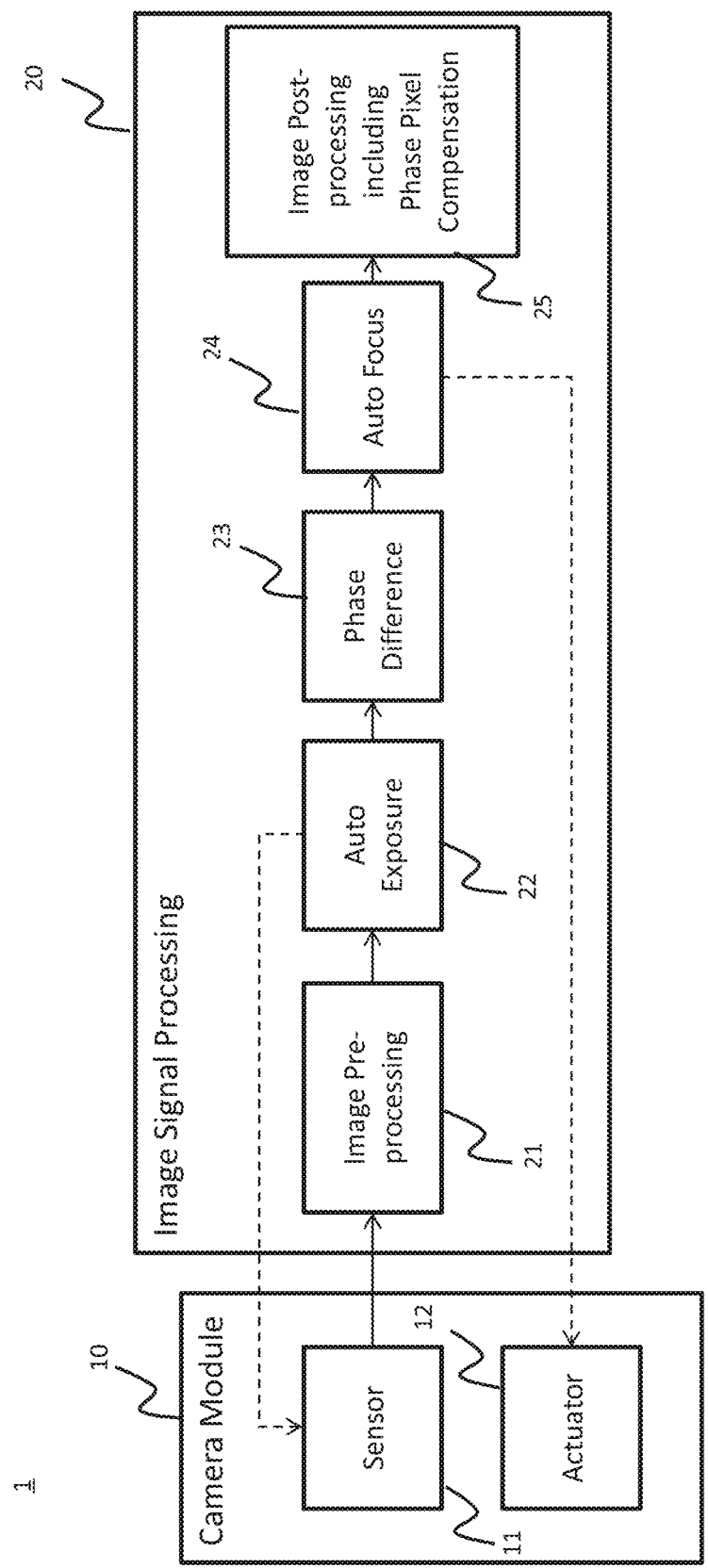
FIG. 2 is a block diagram showing an example of an imaging apparatus.

Hereafter, in reference to FIG. 2, an example of an imaging apparatus using the Bayer pixel pattern shown in FIG. 1 is explained.

FIG. 2 shows an example of a constitution of an imaging apparatus 1. The imaging apparatus 1 includes a camera module 10 and an image signal processing portion 20.

The camera module 10 includes a sensor 11 which captures an image going to be taken. The sensor 11 outputs an image signal which indicates the captured image.

The camera module 10 includes an actuator 12 which drives or moves a lens not shown in the drawings. The actuator 12 drives/moves the lens in accordance with an instruction signal input from the image signal processing portion 20.

The image signal processing portion 20 can be a processor, for example, an LSI (large scale integrated circuit). The image signal processing portion 20 includes an image pre-processing portion 21, an auto-exposure portion 22, a phase difference detection portion 23, an auto-focus portion 24 and an image post-processing portion 25.

The image pre-processing portion 21 conducts a pre-processing operation on the image signal input from the camera module 10. The pre-processing is, for example, a conversion operation from an analog signal to a digital signal and a noise reduction operation. The image pre-processing portion 21 outputs the image signal after conducting the pre-processing operation.

The auto-exposure portion 22 inputs the image signal from the image pre-processing portion 21 and detects amount of light indicated by the image signal. The auto-exposure portion 22 detects the amount of light of a frame which is a whole image indicated by the image signal and generates an exposure control signal for adjusting/controlling the exposure. In addition, the auto-exposure portion 22 calculates a gain for adjusting/controlling the amount of light received by the pixels. In other words, the gain is increased when taking an image in a dark room, and the gain is reduced when taking an image outside a building in a fine day. The gain calculated by the auto-exposure portion is included in the exposure control signal. The auto-exposure portion 22 outputs the exposure control signal to the camera module 10. After applying the exposure and gain to the camera module 10, the auto-exposure portion 22 outputs the image signal to the phase difference detection portion 23.

The sensor 11 of the camera module 10 inputs the exposure control signal and adjusts/controls the exposure and the gain. It may be possible to adjust the exposure and gain of each of the pixels in reference to the exposure control signal. It may be possible to adjust a diaphragm. The diaphragm and a diaphragm driving portion can be included in the camera module 10. The diaphragm may be installed in front of or behind the lens. In this exposure adjustment/control, an average value of amount of light on overall frame may be referred to.

After adjusting the exposure, the auto-exposure portion 22 outputs an image signal to the phase difference detection portion 23. The phase difference detection portion 23 inputs the image signal from the auto-exposure portion 22 and obtains a phase difference of the image which the camera apparatus 1 is taking in reference to the image signal.

The phase difference detection portion 23 outputs the image signal and the phase difference to the auto-focus portion 24. The auto-focus portion 24 inputs the image signal and the phase difference from the phase difference detection portion 23 and conducts an auto-focusing operation based on these image signal and phase difference. This auto-focusing operation is, for example, an adjusting operation of a focal point using the phase difference.

The autofocus portion 24 generates an instruction signal for controlling a lens to adjust the focal point and outputs the instruction signal to the camera module 10.

The actuator 12 of the camera module 10 inputs the instruction signal and moves the lens.

After the auto-focusing operation, the auto-focus portion 24 outputs the image signal of the image which is focused in to the image post-processing portion 25.

The image post-processing portion 25 inputs the image signal from the auto-focus portion 24. The image post-processing portion 25 conducts a post process on the image signal. This post-process may include, for example, white balance adjustment and gamma correction.

In addition, the image post-processing portion conducts a phase pixel compensation operation. As described above, the phase pixels are shielded on their half portion. The phase pixels are used for detecting the phase difference of the light and are not used for imaging. Therefore, the image post-processing portion 25 calculates the intensity of the light output from the phase pixels based on the surrounding pixels and compensates the phase pixels based on the calculated intensity.

The image signal after the post-processing by the image post-processing portion 25 can be stored in, for example, a memory and/or a storage medium which is attachable/detachable to/from the imaging apparatus 1.

3. Embodiment of an Imaging Apparatus

Hereafter, an embodiment of an imaging apparatus using the Bayer pixel pattern is explained.

Figure 3:
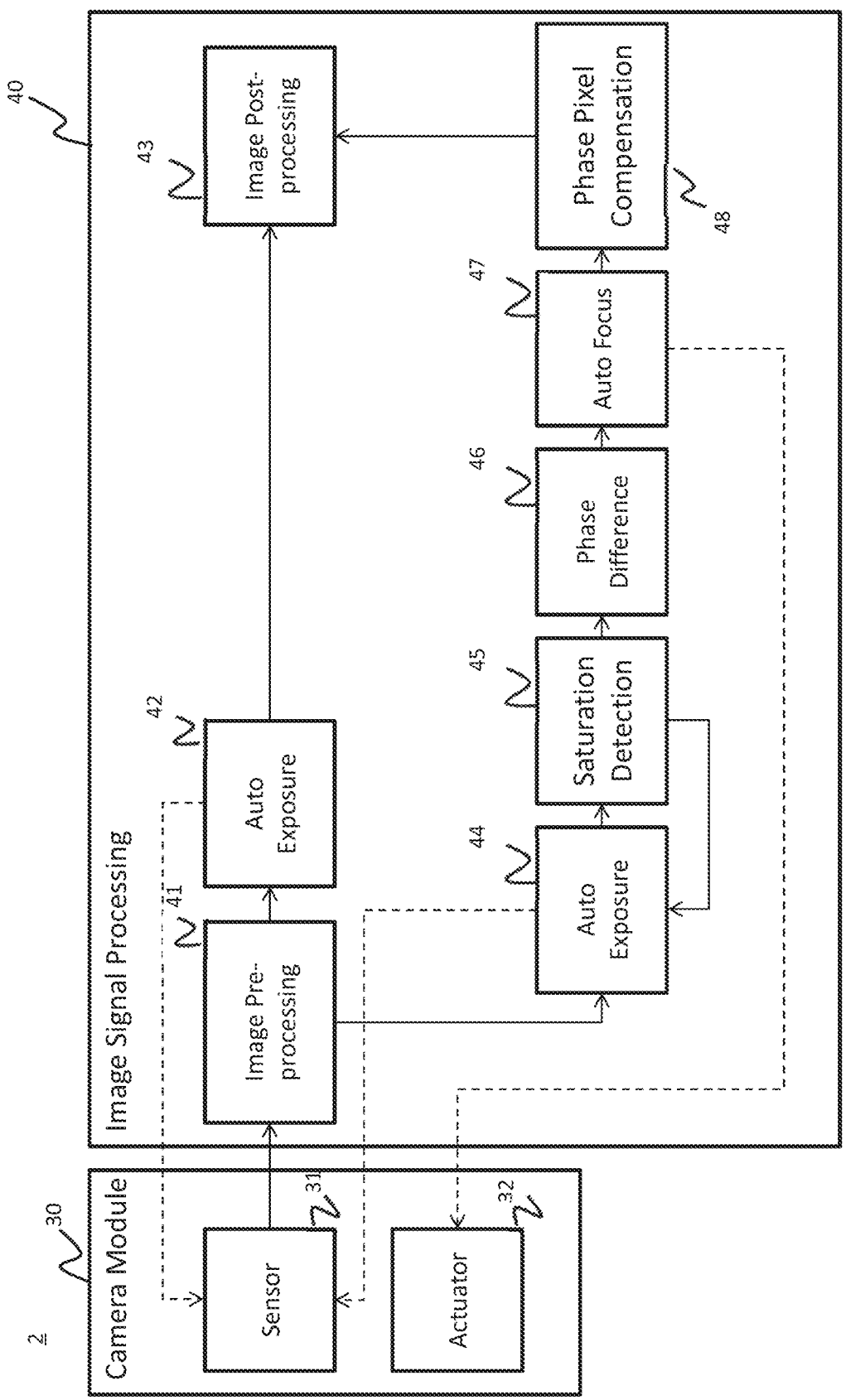
FIG. 3 is a block diagram showing an embodiment of an imaging apparatus.

FIG. 3 shows an exemplary constitution of an imaging apparatus 2. The imaging apparatus 2 includes a camera module 30 and an image signal processing portion 40.

The camera module 30 captures an image to be taken using a sensor 31. The sensor 31 outputs an image signal which indicates the captured image. The sensor 31 can be, for example, a CCD, CMOS or other sensors.

The camera module 30 includes an actuator 32 for moving a lens which is not shown in the drawings. The actuator 32 moves the lens based on the instruction signal input from the image signal processing portion 40.

The image signal processing portion 40 can be a processor, for example, an LSI (Large Scale Integrated Circuit). The image signal processing portion 40 includes an image pre-processing portion 41, auto-exposure portions 42/44, an image post-processing portion 43, a saturation detection portion 45, a phase difference detection portion 46, an auto-focus portion 47 and a phase pixel compensation portion 48.

The image pre-processing portion 41 conducts a pre-processing operation on the image signal input from the camera module 30. The pre-processing is, for example, a conversion operation from an analog signal to a digital signal and a noise reduction operation. The image pre-processing portion 41 outputs the image signal after conducting the pre-processing operation.

The auto-exposure portion 44 inputs the image signal from the image pre-processing portion 41 and detects intensity of the light received by the phase pixels in reference to the image signal. The intensity of the light can be, for example, a voltage. In other examples, the intensity of the light can be expressed in a manner of digital numerals. The intensity can be a range of digital numerals that depend on hardware, for example, 0 to 255 or 0 to 1023.

The auto-exposure portion 44 generates an exposure control signal for controlling/adjusting exposure and gain of each of the phase pixels in accordance with conditions, for example, a dark indoor or bright outdoor.

Figure 4:
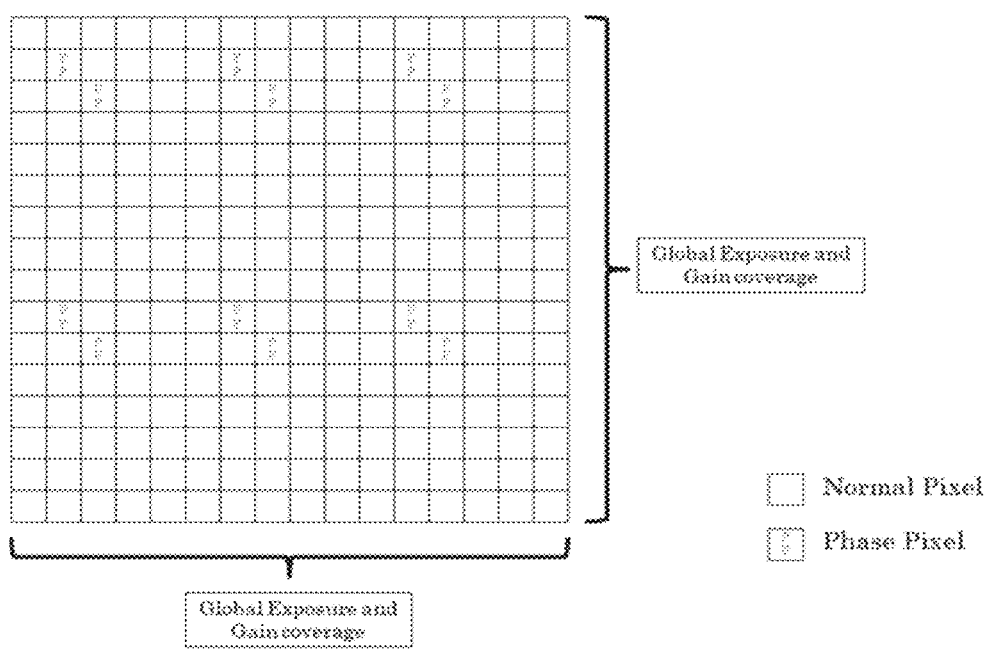
FIG. 4 is a diagram for explaining global exposure and gain settings which affect all pixels.

As described above, in FIGS. 1 and 2, the exposure control function and gain control function may be implemented in a global manner, that is, a single setting of gain/exposure is applied to all pixels in a whole frame which is an image taken or captured with the imaging apparatus. FIG. 4 describes these functions. In FIG. 4, "PP" indicates phase pixels, and blank pixels are normal pixels. A single setting of gain/exposure is applied to all pixels.

Figure 5:
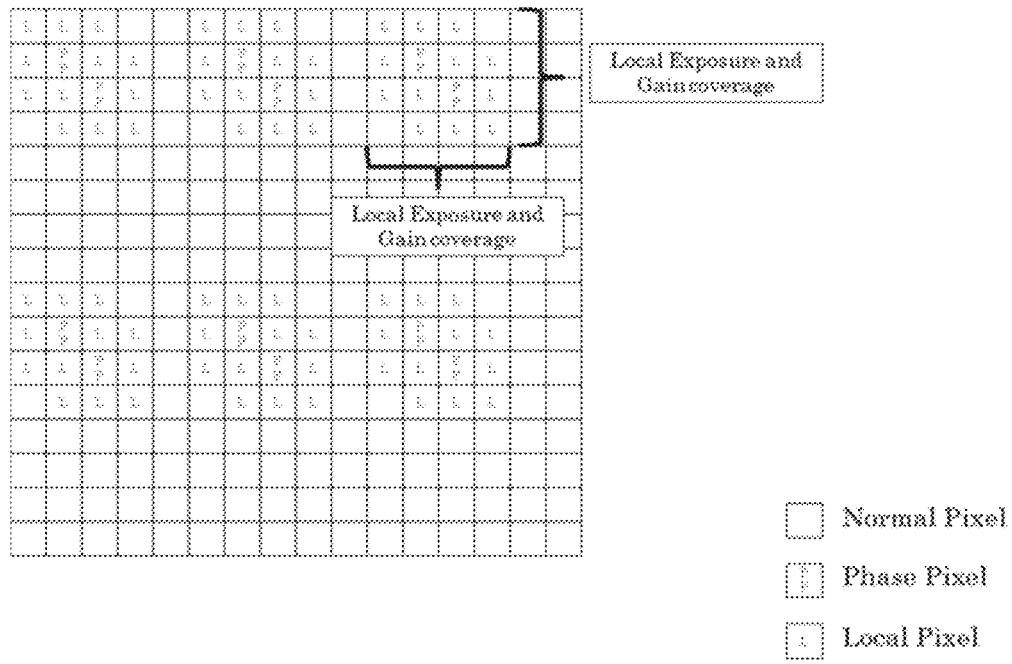
FIG. 5 is a diagram showing phase pixels and local pixels to which exposure and gain controls are applied separately from normal pixels.

FIG. 5 shows an arrangement of phase pixels. In FIG. 5, "PP" indicates a phase pixel, "L" indicates a local pixel and other blank pixels are normal pixels. The phase pixels are pixels for detecting the phase as described in FIG. 1. The local pixels are pixels which are surrounding the phase pixels. The normal pixels are outside the local pixels. The local pixels and normal pixels detect the light.

In FIG. 5, the local pixels are arranged only around the phase pixels. However, it may be possible to apply different arrangement for the local pixels. For example, it may be possible to arrange the local pixels at right and left sides of the phase pixels. The auto-exposure portion 44 controls and adjusts the exposure and gain of each of the phase pixels. Therefore, different exposure and gain are applied to each of the phase pixels. In addition, the auto-exposure portion 44 controls and adjusts the exposure and gain of each of the local pixels. Therefore, different exposure and gain are applied to each of the local pixels.

The auto-exposure portion 44 controls and adjusts the exposure and gain of each of the phase pixels and local pixels. In this controlling operation, the auto-exposure portion 44 controls and adjusts the exposure and gain of phase/local pixels so as to maintain the intensity of the light within a predetermined range.

In this controlling operation of the auto-exposure portion 44, regarding the gain control/adjustment, for example, first, initial/default values of gain are applied to the phase/local pixels. If the saturation detection portion 45 detects one of the phase pixels exceeding the maximum acceptable value of the intensity of light, that is, if the saturation detection portion 45 detects saturation of one of the phase pixels, the auto-exposure portion 44 decreases the gain of this saturated phase pixel and the local pixel(s) surrounding the saturated phase pixel by, for example, 10%. After the reduction of the gain, if the saturation detection portion detects that this phase pixel is still saturated, the auto-exposure portion 44 reduces the gain of the saturated phase pixel and the local pixel surrounding this saturated phase pixel by 10% again. This reduction operation is repeated until the saturation is resolved, and the gains of the saturated phase pixel and surrounding local pixel(s) are determined.

If the saturation detection portion 45 detects saturation of one of the local pixels while the phase pixel which is surrounded by this local pixel is not saturated, the auto-exposure portion 44 decreases the gain of this saturated local pixel by, for example, 10%. After the reduction of the gain, if the saturation detection portion 45 detects that this local pixel is still saturated, the auto-exposure portion 44 reduces the gain of the saturated local pixel by 10% again. This reduction operation is repeated until the saturation is solved, and the gains of the saturated local pixel(s) are determined.

On the other hand, if the saturation detection portion 45 detects that the intensity of the light received by one of the phase pixels is lower than the minimum level of the above-described predetermined range, the auto-exposure portion 44 increases the gain of this phase pixel and the local pixel(s) surrounding this phase pixel by, for example, 10%. After the increase of the gain, if the saturation detection portion detects that this phase pixel is still under the lowest level, the auto-exposure portion 44 increases the gain of the phase pixel and the local pixel surrounding this saturated phase pixel by 10% again. This increasing operation is repeated until the intensity of the light becomes higher than the lowest level, and the gains of the phase pixel and surrounding local pixel(s) are determined.

If the saturation detection portion 45 detects that intensity of the light of one of the local pixels is lower than the lowest level while the phase pixel which is surrounded by this local pixel is higher than the lowest level, the auto-exposure portion 44 increases the gain of this local pixel by, for example, 10%. After the increase of the gain, if the saturation detection portion 45 detects that this local pixel is still lower than the lowest level, the auto-exposure portion 44 increases the gain of the local pixel by 10% again. This increasing operation is repeated until the local pixel exceeds the lowest level, and the gains of the local pixel(s) are determined.

In addition, in this controlling operation of the auto-exposure portion 44, regarding the exposure control/adjustment, for example, first, initial/default values of exposure time are applied to the phase/local pixels. If the saturation detection portion 45 detects one of the phase pixels exceeding the maximum acceptable value of the intensity of light, that is, if the saturation detection portion 45 detects saturation of one of the phase pixels, the auto-exposure portion 44 decreases the exposure time of this saturated phase pixel and the local pixel(s) surrounding the saturated phase pixel by 10%. After the reduction of the exposure time, if the saturation detection portion detects that this phase pixel is still saturated, the auto-exposure portion 44 reduces the exposure time of the saturated phase pixel and the local pixel surrounding this saturated phase pixel by 10% again. This reduction operation is repeated until the saturation is resolved, and the exposure time of the saturated phase pixel and surrounding local pixel(s) are determined.

If the saturation detection portion 45 detects saturation of one of the local pixels while the phase pixel which is surrounded by this local pixel is not saturated, the auto-exposure portion 44 decreases the exposure time of this saturated local pixel by 10%. After the reduction of the exposure time, if the saturation detection portion 45 detects that this local pixel is still saturated, the auto-exposure portion 44 reduces the exposure time of the saturated local pixel by 10% again. This reduction operation is repeated until the saturation is resolved, and the exposure time of the saturated local pixel(s) are determined. The calculated gain is included in the gain setting.

On the other hand, if the saturation detection portion 45 detects that the intensity of the light received by one of the phase pixels is lower than the minimum level of the above-described predetermined range, the auto-exposure portion 44 increases the exposure time of this phase pixel and the local pixel(s) surrounding this phase pixel by 10%. After the increase of the exposure time, if the saturation detection portion detects that this phase pixel is still under the lowest level, the auto-exposure portion 44 increases the exposure time of the phase pixel and the local pixel surrounding this saturated phase pixel by 10% again. This increasing operation is repeated until the intensity of the light becomes higher than the lowest level, and the gains of the phase pixel and surrounding local pixel(s) are determined.

If the saturation detection portion 45 detects that intensity of the light of one of the local pixels is lower than the lowest level while the phase pixel which is surrounded by this local pixel is higher than the lowest level, the auto-exposure portion 44 increases the gain of this local pixel by 10%. After the increase of the gain, if the saturation detection portion 45 detects that this local pixel is still lower than the lowest level, the auto-exposure portion 44 increases the gain of the local pixel by 10% again. This increasing operation is repeated until the local pixel exceeds the lowest level, and the gains of the local pixel(s) are determined. The calculated exposure time is included in the exposure setting.

It may be possible to apply only the gain control/adjustment to the auto-exposure portion 44.

The auto-exposure portion 44 outputs the exposure control signal including the gain setting (and exposure setting) to the camera module 30.

The sensor 31 of the camera module 30 inputs the exposure control signal and adjusts/controls the gain and exposure. It may be possible to control/adjust the gain and/or exposure of each of the phase/local pixels by using an analog register and/or a digital register corresponding to each of the phase/local pixels, storing the gain/exposure-time in the register(s) in reference to the gain control signal and adjusting/controlling the gain/exposure-time of each of the phase/local pixels. This controlling/adjusting operation applies the gain/exposure-time to each of the phase/local pixels.

After controlling/adjusting the gain/exposure, the phase difference detection portion 46 inputs the image signal passed through the auto-exposure portion 44 and the saturation detection portion 45.

The phase difference detection portion 46 obtains the phase difference of the image to be taken in reference to the image signal. It may be possible for the phase difference detection portion 46 to determine the phase difference in reference to only the phase pixels. The auto-focusing operation refers to the phase difference, and thus, the phase pixels can be used for auto-focusing operation.

The phase difference detection portion 46 outputs the image signal and the phase difference to the auto-focus portion 47. The auto-focus portion 47 inputs the image signal and the phase difference from the phase difference detection portion 46 and conducts the auto-focus operation based on the phase difference and the image signal. Therefore, the image signal input by the auto-focus portion 47 indicates the image after adjusting/controlling the gain/exposure of each of the phase/local pixels. The auto-focus portion 47 conducts, for example, adjustment of the focal point using the phase difference.

The auto-focus portion 47 compares the phase difference to a predetermined threshold. If the phase difference is larger than the threshold, the auto-focus portion 47 determines how much the lens should be moved to adjust the focal point, generates an instruction signal for instructing the camera module 30 to move the lens and outputs the instruction signal to the camera module 30.

The actuator 32 of the camera module 30 inputs the instruction signal and moves the lens in accordance with the instruction signal.

This auto-focus operation is conducted after controlling/adjusting the gain/exposure of the phase/local pixels. Therefore, for example, saturation of the phase/local pixels may be avoided beforehand, and thus, the auto-focus operation may have high accuracy and may be completed in a short time.

After the auto-focusing operation, the auto-focus portion 47 outputs the image signal to the phase pixel compensation portion 48 which conducts a compensation operation of the phase pixels. As described above, the phase pixels are half-shielded. The phase pixels are used for, for example, auto-focusing, not imaging. Therefore, the phase pixel compensation portion 48 estimates or calculates the intensity of the light received by the phase pixels based on the intensity of the light received by the pixels around the phase pixels, and compensates the phase pixels based on the estimation/calculation results. It may be possible for the phase pixel compensation portion 48 to compensate the phase pixels in reference to the normal pixels around the local pixels. It may be also possible for the phase pixel compensation portion 48 to compensate the phase pixels based on the local and normal pixels while recovering the intensity of the light received by the local pixels. If the intensity of the light received by the phase pixels is lower than the normal pixels, the phase pixel compensation portion 48 can increase the intensity so as to be the same level as the normal pixels around the phase pixels. The phase pixel compensation portion 48 outputs the compensation results, for example, compensated intensity of the light received by the phase pixels, to the image post-processing portion 43. The image post-processing portion 43 inputs the compensation results of the phase pixels.

In parallel with the above-described operations between the auto-exposure portion 44 and the phase pixel compensation portion 48, the auto exposure portion 42 inputs the image signal from the image pre-processing portion 41 and determines the exposure of the whole frame. The auto-exposure portion 42 outputs exposure information including information of the exposure of the whole frame to the camera module 30.

The sensor 31 of the camera module 30 inputs the exposure information from the auto-exposure portion 42. The sensor 31 adjusts the exposure of all pixels of the frame based on this exposure information. The auto-exposure portion 42 outputs the image signal in which the exposure of all pixels is adjusted to the image post-processing portion 43. This image signal indicates an image in which the focus is adjusted by the auto-focus portion 47.

The image post-processing portion 43 inputs the image signal from the auto-exposure portion 42. The image post-processing portion 43 merges the image signal with the compensation results of the phase pixels. The image post-processing portion 43 conducts a post process on the image signal. This post-process may include, for example, white balance adjustment and gamma correction.

The image signal after the post-processing by the image post-processing portion 43 can be stored in, for example, a memory and/or a storage medium which is attachable/detachable to/from the imaging apparatus 2.

Hereafter, examples of exposure control/adjustment and gain control/adjustment are shown.

Figure 6:
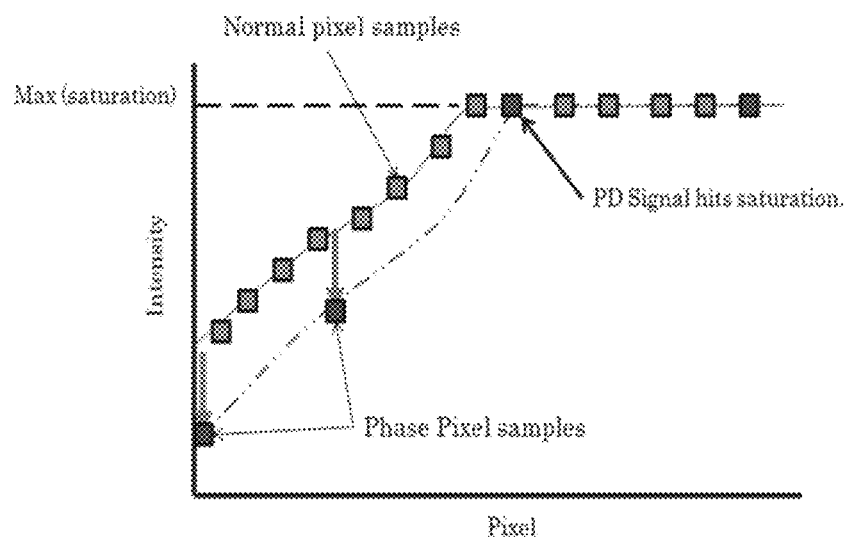
FIG. 6 is a graph showing intensity of light received by phase pixels and normal pixels.

FIG. 6 shows an example of signals indicating intensity of light output from each of the pixels of the above-described imaging apparatus 1 of FIG. 2 to which the global settings of the exposure control and gain control are applied. The intensity of the light can be, for example, a voltage. Other than this, the intensity of the light can be expressed in a manner of digital numerals. The intensity can be a range of digital numerals depend on hardware, for example, 0 to 255 or 0 to 1025.

In a case in which the global settings of the gain control and exposure control are applied to the imaging apparatus 1, all pixels are affected. Therefore, as shown in FIG. 6, when the intensity of the light received by the normal pixels around one of the phase pixels reaches the maximum value (MAX (saturation)), there is a possibility that the intensity of this phase pixel may reach the maximum value too, that is, the phase pixel is saturated. In such a case in which the phase signal output from the phase pixel is saturated, it becomes difficult to detect the phase difference by the phase difference detection portion 23 of FIG. 2. Because it is difficult to detect the phase difference, it becomes difficult for the auto-focus portion 24 to determine how the lens should be moved. Due to this, the imaging apparatus 1 may try to obtain the phase difference in order to adjust the focal point through multiple frames.

Figure 7:
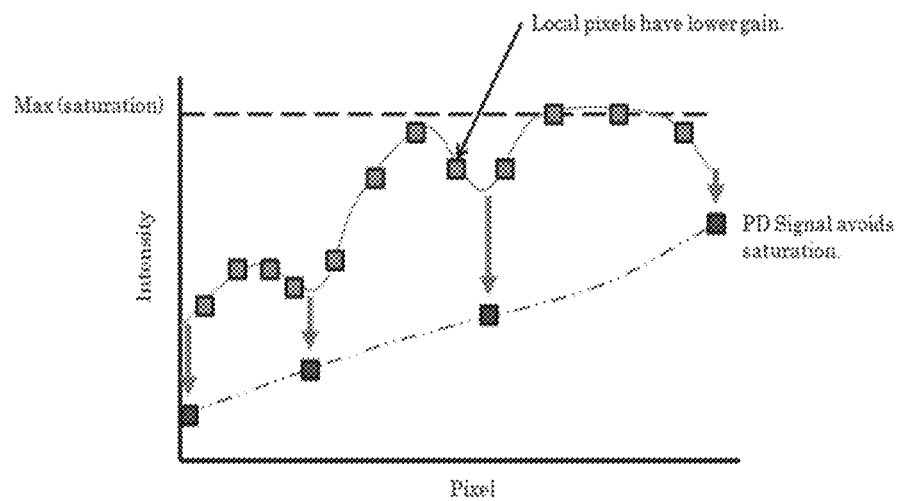
FIG. 7 is a graph showing intensity of light received by phase pixels and local pixels.

FIG. 7 shows an example of signals indicating the intensity of light output from the pixels of the above-described imaging apparatus 2 of FIG. 3 in which the gain control and exposure control of each of the phase/local pixels are respectively adjusted. It may be possible to avoid saturation of the phase pixels because the gain/exposure of the phase pixels are respectively controlled/adjusted. In addition, comparatively low gain (and exposure) is applied to each of the local pixels surrounding the phase pixels. Therefore, it may be possible to avoid negative influence, for example, blooming due to saturation of the local pixels.

4. Saturation and Phase Difference

Figure 8:
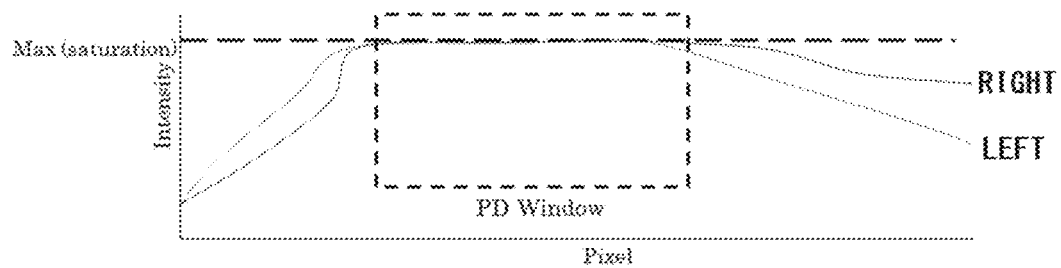
FIG. 8 is a graph showing saturation of phase detection signals.

FIG. 8 shows examples of intensity of light output from right-shielded phase pixels and left-shielded phase pixels of the imaging apparatus 1 shown in FIG. 2 when conducting the auto-focus operation. A vertical axis indicates the intensity of light received by the sensor, that is, strength of the signals output from the pixels. A horizontal axis indicates the right-shielded phase pixels and left-shielded phase pixels on the frame. A square with a dotted line at the center of FIG. 8 shows a PD window (phase detection window) which is an area on a frame or an image including the phase pixels which are used for auto-focusing. There may be 2 or more PD windows on one frame or one image. A user can select one of the PD windows. Two lines indicate signals output from the right-shielded phase pixels ("RIGHT") and left-shielded phase pixels ("LEFT").

FIG. 8 shows that in the PD window, the two lines reach a line (MAX (Saturation)) indicating saturation. Therefore, it may be difficult for the imaging apparatus 1 of FIG. 2 to detect the phase difference.

Figure 9:
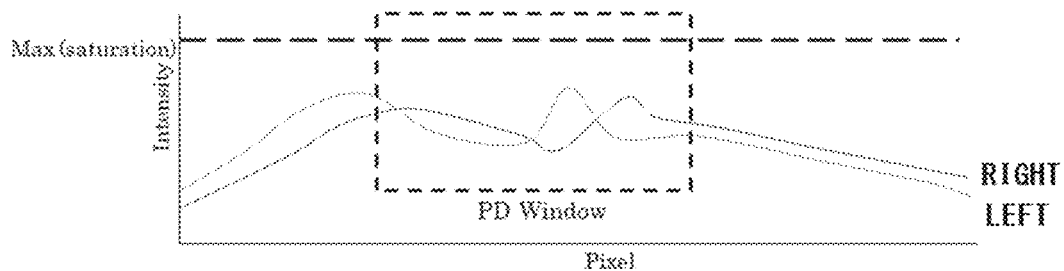
FIG. 9 is a graph showing phase detection signals within a normal signal range.

FIG. 9 shows examples of intensity of light output from right-shielded phase pixels and left-shielded phase pixels of the imaging apparatus 2 shown in FIG. 3 when conducting the auto-focus operation. A vertical axis indicates the intensity of light received by the sensor, that is, strength of the signals output from the pixels. A horizontal axis indicates the right-shielded phase pixels and left-shielded phase pixels on the frame. A square with a dotted line at the center of FIG. 9 shows a PD window (phase detection window) which is an area on a frame or an image including the phase pixels which are used for auto-focusing. There may be 2 or more PD windows on one frame or one image. A user can select one of the PD windows. Two lines indicates signals output from the right-shielded phase pixels ("RIGHT") and left-shielded phase pixels ("LEFT").

Two lines, "RIGHT" and "LEFT", do not reach the line (MAX (saturation)) indicating saturation. This is because gain (and exposure) of the phase pixels and local pixels are adjusted. Therefore, it may be possible to avoid saturation of the phase pixels. It may be possible for the imaging apparatus 2 of FIG. 3 to detect the phase difference. In FIG. 9, each of "RIGHT" and "LEFT" have a vertex inside the PD window. It may be possible for the imaging apparatus 2 to determine the focal point based on a gap or interval between these two vertexes.

Figure 10:
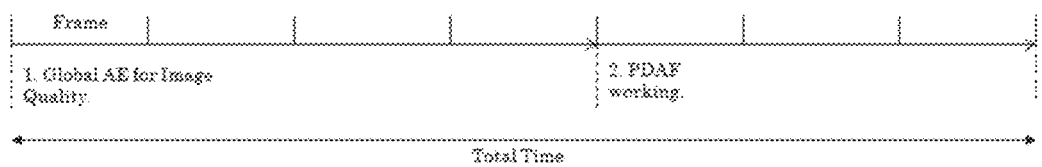
FIG. 10 is a time chart showing a sequential calling operation of auto-exposure and auto-focus.

FIG. 10 shows a sequence of the auto-focus operation and auto-exposure operation of the imaging apparatus 1 shown in FIG. 2. In FIG. 10, first, the imaging apparatus 1 conducts the auto-exposure operation to determine the global exposure regarding a whole image (Global AE for Image Quality). This auto-exposure operation may contribute improvement of overall quality of the image. After the auto-exposure operation, the imaging apparatus 1 conducts the auto-focus operation (PDAF) using the phase pixels. Therefore, an operation time of the imaging apparatus 1 is auto-exposure time plus auto-focus time in total.

"Frame" shown in FIG. 10 is a time interval for obtaining or capturing signals of one image from the sensor. "Frame" may be, for example, 30 milli-seconds and may depend on hardware. It can be possible that the imaging apparatus 2 obtains two or more images within one "Frame", for example, if the apparatus includes two sensors.

Figure 11:
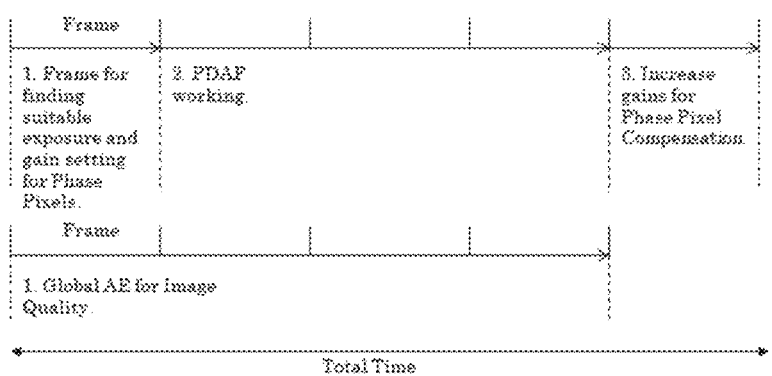
FIG. 11 is a time chart showing a calling operation of auto-exposure and auto-focus in parallel

FIG. 11 shows a sequence of operations of the imaging apparatus 2 shown in FIG. 3. The upper portion of FIG. 11 shows "1. Frame for finding suitable exposure and gain setting for phase pixels", "2. PDAF working" and "3. Increase gains for phase pixel compensation". "PDAF" is "phase detection auto-focus", and an auto-focus operation using phase pixels after gain (and exposure) control/adjustment described in FIG. 3 is conducted here. The phase pixel compensation conducted by the phase pixel compensation portion 48 refers to the final frame or image. Therefore, the phase pixels are compensated so as to have the similar intensity to the normal pixels. This may improve the quality of the image taken by the imaging apparatus 2.

The lower operation includes "1. Global AE for Image Quality". "AE" is an auto-exposure operation, and the exposure of the overall image is determined in this operation. The upper operation and the lower operation are conducted in parallel. Therefore, the total operation time may be shorter than FIG. 10.

In accordance with the constitution disclosed in FIG. 3 and explanations of FIGS. 6 to 11, the embodiment described above may have advantages, for example, as shown below.

(1) The embodiment may independently increase the Signal-to-Noise Ratio for Phase Pixels without degrading the intended performance of normal pixels.

(2) The embodiment may improve the accuracy of the phase detection operation and improve the image quality.

(3) The embodiment may allow parallel execution of the auto-exposure for phase detection purpose and image quality purpose in order to keep the auto-focus times fast.

(4) The embodiment may prevent and/or reduce the amount of leakage from saturated pixels to phase pixels and improve time and accuracy of the auto-focus operation.

(5) The embodiment includes the phase pixel compensation operation which may allow phase pixel intensity levels to match normal pixels for image quality purpose.

In addition, the above embodiment may have advantage of the local exposure control in which performance of the phase detection is better even when the normal pixels are saturated because the phase pixels are not saturated. With separate and individual gain control, the objective of obtaining a good signal for image quality and also phase detection may be possible.

In the above embodiment, the phase pixel compensation operation can also be done using an independent gain control. Once the PDAF stage has finished, the final frame or image can be used to increase gains for the phase pixels, so that the phase pixels can be of similar sensitivity levels as the normal pixels for better image quality purpose.

5. Other Aspects

Other than the above explanation, the above-described embodiment may have further aspects as described below.

An imaging apparatus of a first aspect for capturing an image includes: an image sensor having multiple pixels; multiple phase pixels which are included in the multiple pixels and which output a first signal indicating intensity of light; a first adjustment portion conducting gain adjustment on the multiple phase pixels in reference to the first signal; an auto-focus portion adjusting a focal point of the image in reference to a second signal output from the multiple phase pixels after the gain adjustment; a compensation portion generating and outputting a compensation signal indicating intensity of light received by the multiple phase pixels in reference to signals output from the multiple pixels; a second adjustment portion determining exposure and gain for taking the image in reference to signals output from the multiple pixels and applying the exposure and the gain to the multiple pixels; and an image processing portion inputting both the compensation signal and signals output from the multiple pixels to which the exposure and the gain were applied, and generating image data.

The imaging apparatus of a second aspect according to the first aspect further includes multiple local pixels which are included in the multiple pixels and which are neighboring the multiple phase pixels, wherein the first adjustment portion conducts gain adjustment of the multiple local pixels.

In the imaging apparatus of a third aspect according to the first aspect, if the first adjustment portion detects saturation of a phase pixel included in the multiple phase pixels in reference to the first signal, the first adjustment portion reduces the gain of the saturated phase pixel.

In the imaging apparatus of a fourth aspect according to the second aspect, if the first adjustment portion detects saturation of a phase pixel included in the multiple phase pixels in reference to the first signal, the first adjustment portion reduces the gain of the saturated phase pixel and the gain of a local pixel included in the multiple local pixels and neighboring the saturated phase pixel.

In the imaging apparatus of fifth aspect according to the first aspect, the second adjustment portion is operable in parallel with the auto-focus portion.

In the imaging apparatus of sixth aspect according to the third aspect, the first adjustment portion repeatedly reduces the gain of the saturated phase pixel until the saturation is resolved.

In the imaging apparatus of a seventh aspect according to the first aspect, the first adjustment portion increases the gain of a phase pixel included in the multiple phase pixels if intensity of light received by the phase pixel is lower than a predetermined range in reference to the first signal.

In the imaging apparatus of an eighth aspect according to the second aspect, the first adjustment portion increases the gain of a local pixel included in the plurality of local pixels if intensity of light received by a phase pixel included in the multiple phase pixels and neighboring the local pixel is lower than a predetermined range in reference to the first signal.

A mobile terminal of a ninth aspect includes the imaging apparatus according to the first aspect.

In the imaging apparatus of a tenth aspect according to the first aspect, the first adjustment portion conducts an exposure adjustment of the multiple phase pixels, and the second signal is generated after the exposure adjustment of the multiple phase pixels.

An imaging method of an eleventh aspect for taking an image includes: outputting a first signal indicating intensity of light received by multiple phase pixels, wherein the multiple phase pixels are included in multiple pixels; conducting gain adjustment on the multiple phase pixels by a first adjustment portion in reference to the first signal; adjusting a focal point of the image by an auto-focus portion in reference to a second signal output from the multiple phase pixels after the gain adjustment; generating and outputting, by a compensation portion, a compensation signal indicating intensity of light received by the multiple phase pixels in reference to signals output from the multiple pixels; by a second adjustment portion, determining exposure and gain for taking the image in reference to signals output from the multiple pixels and applying the exposure and the gain to the multiple pixels; and by an image processing portion, inputting both the compensation signal and signals output from the multiple pixels to which the exposure and the gain were applied and generating image data.

The imaging method of a twelfth aspect according to the eleventh aspect further includes: conducting, by the first adjustment portion, gain adjustment of multiple local pixels which are included in the multiple pixels and which are neighboring the multiple phase pixels.

The imaging method of a thirteenth aspect according to the eleventh aspect further includes: reducing, by the first adjustment portion, the gain of a phase pixel included in the multiple phase pixels if the first adjustment portion detects saturation of the phase pixel in reference to the first signal.

The imaging method of a fourteenth aspect according to the twelfth aspect further includes: reducing, by the first adjustment portion, the gain of a phase pixel included in the multiple phase pixels and the gain of a local pixel included in the multiple local pixels if the first adjustment portion detects saturation of the phase pixel in reference to the first signal.

In the imaging method of a fifteenth aspect according to the eleventh aspect, the second adjustment portion is operable in parallel with the auto-focus portion.

In the imaging method of a sixteenth aspect according to the thirteenth aspect, the first adjustment portion repeatedly reduces the gain of the saturated phase pixel until the saturation is resolved.

The imaging method of a seventeenth aspect according to the eleventh aspect further includes: increasing, by the first adjustment portion, the gain of a phase pixel included in the multiple phase pixels if intensity of light received by the phase pixel is lower than a predetermined range in reference to the first signal.

The imaging method of an eighteenth aspect according to the twelfth aspect further includes: increasing, by the first adjustment portion, the gain of a local pixel included in the multiple local pixels if intensity of light received by a phase pixel included in the multiple phase pixels and neighboring the local pixel is lower than a predetermined range in reference to the first signal.

A mobile terminal of a nineteenth aspect is configured to conduct operations of the imaging method according to the eleventh aspect.

In the imaging method of twentieth aspect according to the eleventh aspect, the conducting gain adjustment on the multiple phase pixels includes conducting an exposure adjustment of the multiple phase pixels, and the second signal is generated after the exposure adjustment of the multiple phase pixels.

An imaging apparatus of a twenty-first aspect for capturing an image includes: an image sensing means including multiple pixels; multiple phase pixels which are included in the multiple pixels and which output a first signal indicating intensity of light; a first adjusting means conducting gain adjustment on the multiple phase pixels in reference to the first signal; an auto-focusing means adjusting a focal point of the image in reference to a second signal output from the multiple phase pixels after the gain adjustment; a compensation means generating and outputting a compensation signal indicating intensity of light received by the multiple phase pixels in reference to signals output from the multiple pixels; a second adjusting means determining exposure and gain for taking the image in reference to signals output from the multiple pixels and applying the exposure and the gain to the multiple pixels; and an image processing means inputting both the compensation signal and signals output from the multiple pixels to which the exposure and the gain were applied, and generating image data.

The above-explained embodiment and aspects are mere examples. It is possible to apply various changes, replacement, addition and/or omission to the embodiment.

For example, the above explanation is based on Bayer pixel pattern with three colors. It is possible to apply other pixel patterns to the above embodiment. It is possible to apply different colors to the above embodiment For example, the imaging apparatus can be a camera such as a DSLR. In addition, the imaging apparatus can be embedded in other apparatuses or devices such as a cellular phone, personal computer, interphone, monitoring system, security system, car-mounted camera and medical devices.

For example, the imaging apparatus embedded in a cellular phone can be constituted so as to conduct imaging operations in accordance with instructions input from a processor of the cellular phone.

For example, the imaging apparatus can include a memory and/or an attachable/detachable storage medium. The storage medium can be a memory card, USB memory and/or other mediums. The imaging apparatus can be constituted to communicate with other devices such as a cellular phone, personal computer and/or mobile terminal and transmit the images to other devices via a network.

For example, the imaging apparatus can include a display portion on which the image which was taken or going to be taken is displayed.

For example, the imaging apparatus can include CCD, CMOS and/or other sensors. The above embodiment can be implemented using other sensors.

What is claimed is:

1. An apparatus comprising:
   an image sensor comprising a plurality of pixels, the plurality of pixels comprising a plurality of phase pixels and the plurality of phase pixels being configured to output a first signal indicating light intensity; and
   an image signal processor configured to:
   conduct gain adjustment on the plurality of phase pixels according to the first signal;

increase the gain of a second phase pixel of the plurality of phase pixels when light intensity received by the second phase pixel is lower than a predetermined range according to the first signal;
adjust a focal point of an image according to a second signal, wherein the second signal is outputted by the plurality of phase pixels after the gain adjustment;
generate and output a compensation signal indicating light intensity received by the plurality of phase pixels according to the signals outputted by the plurality of pixels;
determine exposure and gain for capturing the image according to signals outputted by the plurality of pixels and apply the exposure and the gain to the plurality of pixels;
input both the compensation signal and the signals output from the plurality of pixels on which the exposure and the gain were applied; and
generate image data.

2. The apparatus according to claim 1, wherein, when the image signal processor is configured to detect saturation of a first phase pixel of the plurality of phase pixels in reference to the first signal, the image signal processor is configured to reduce the gain of the first phase pixel.

3. The apparatus according to claim 2, wherein the image signal processor is configured to repeatedly reduce the gain of the first phase pixel until the first phase pixel is not saturated.

4. The apparatus according to claim 1, wherein the plurality of pixels comprise a plurality of local pixels, the plurality of local pixels neighboring the plurality of phase pixels, and wherein the image signal processor is configured to conduct gain adjustment of the plurality of local pixels.

5. The apparatus according to claim 4, wherein, when the image signal processor is configured to detect saturation of a first phase pixel of the plurality of phase pixels in reference to the first signal, the image signal processor is configured to reduce the gain of the first phase pixel and the gain of a first local pixel of the plurality of local pixels, the first local pixel neighboring the first phase pixel.

6. The apparatus according to claim 4, wherein the image signal processor is configured to increase the gain of a second local pixel of the plurality of local pixels when light intensity received by a second phase pixel of the plurality of phase pixels is lower than a predetermined range according to the first signal, the second phase pixel neighboring the second local pixel.

7. The apparatus according to claim 1, wherein the image signal processor is configured to adjust an exposure of the plurality of phase pixels, and wherein the second signal is generated after the exposure of the plurality of phase pixels is adjusted.

8. The apparatus of claim 1, wherein the plurality of pixels comprise a plurality of local pixels, the plurality of local pixels neighboring the plurality of phase pixels, and wherein the image signal processor is configured to conduct gain adjustment of the plurality of local pixels.

9. A method comprising:
outputting, by an image sensor, a first signal indicating light intensity received by a plurality of phase pixels of a plurality of pixels;
conducting, by a first adjuster, gain adjustment on the plurality of phase pixels according to the first signal;
increasing, by the first adjuster, gain of a second phase pixel of the plurality of phase pixels when light intensity received by the second phase pixel is lower than a predetermined range according to the first signal; and
adjusting, by an auto-focuser, a focal point of an image according to a second signal, the second signal being outputted by the plurality of phase pixels after the gain adjustment;
generating and outputting, by a compensator, a compensation signal indicating light intensity received by the plurality of phase pixels according to signals outputted by the plurality of pixels;
determining exposure and gain, by a second adjuster, for capturing the image according to the signals outputted by the plurality of pixels and applying the exposure and the gain to the plurality of pixels; and
inputting, by an image processor, both the compensation signal and the signals output from the plurality of pixels on which the exposure and the gain were applied and generating image data.

10. The method according to claim 9, further comprising reducing, by the first adjuster, the gain of a first phase pixel of the plurality of phase pixels when the first adjuster detects saturation of the first phase pixel according to the first signal.

11. The method to claim 10, wherein the first adjuster repeatedly reduces the gain of the first phase pixel until the first phase pixel is not saturated.

12. The method according to claim 9, wherein the second adjuster operates in parallel with the auto-focuser.

13. The method according to claim 9, further comprising conducting, by the first adjuster, gain adjustment of a plurality of local pixels of the plurality of pixels, the plurality of local pixels neighboring the plurality of phase pixels.

14. The method according to claim 13, further comprising reducing, by the first adjuster, gain of a first phase pixel of the plurality of phase pixels and gain of a first local pixel of the plurality of local pixels when the first adjuster detects saturation of the first phase pixel according to the first signal.

15. The method according to claim 13, further comprising increasing, by the first adjuster, gain of a second local pixel of the plurality of local pixels when light intensity received by a second phase pixel of the plurality of phase pixels is lower than a predetermined range according to the first signal, the second phase pixel is neighboring the second local pixel.

16. The method according to claim 9, wherein conducting gain adjustment on the plurality of phase pixels comprises conducting an exposure adjustment of the plurality of phase pixels, and the second signal is generated after the exposure adjustment of the plurality of phase pixels.

17. A method comprising:
outputting, by an image sensor, a first signal indicating light intensity received by a plurality of phase pixels of a plurality of pixels;
conducting, by a first adjuster, gain adjustment on the plurality of phase pixels according to the first signal;
conducting, by the first adjuster, gain adjustment of a plurality of local pixels of the plurality of pixels, the plurality of local pixels neighboring the plurality of phase pixels;
reducing, by the first adjuster, gain of a first phase pixel of the plurality of phase pixels and gain of a first local pixel of the plurality of local pixels when the first adjuster detects saturation of the first phase pixel according to the first signal; or
increasing, by the first adjuster, gain of a second local pixel of the plurality of local pixels when light intensity received by a second phase pixel of the plurality of phase pixels is lower than a predetermined range according to the first signal, the second phase pixel is neighboring the second local pixel;

adjusting, by an auto-focuser, a focal point of an image according to a second signal, the second signal is outputted by the plurality of phase pixels after the gain adjustment;

generating and outputting, by a compensator, a compensation signal indicating light intensity received by the plurality of phase pixels according to signals outputted by the plurality of pixels;

determining exposure and gain, by a second adjuster, for capturing the image according to the signals outputted by the plurality of pixels and applying the exposure and the gain to the plurality of pixels; and inputting, by an image processor, both the compensation signal and the signals output from the plurality of pixels on which the exposure and the gain were applied and generating image data.

* * * * *